Oct. 2, 1951
C. A. McKEE
2,570,142
LAND LEVELING DEVICE
Filed Jan. 29, 1949
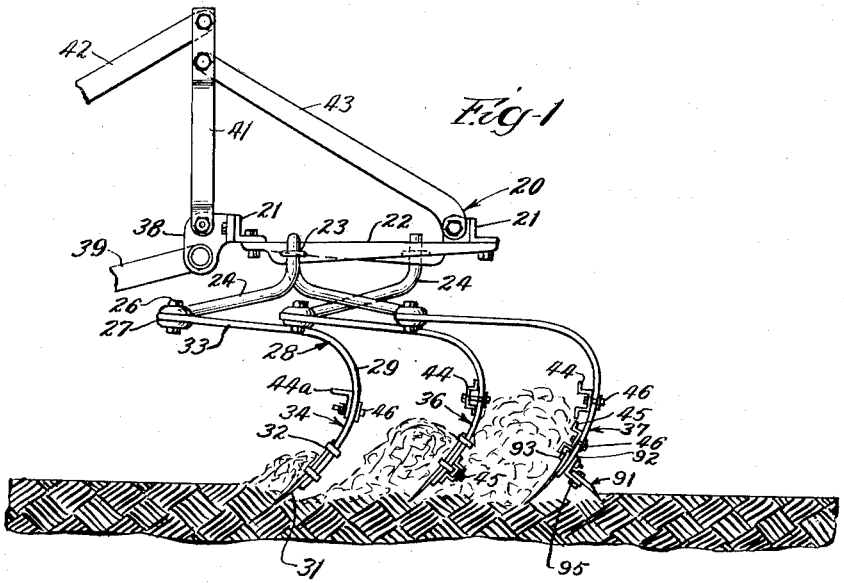
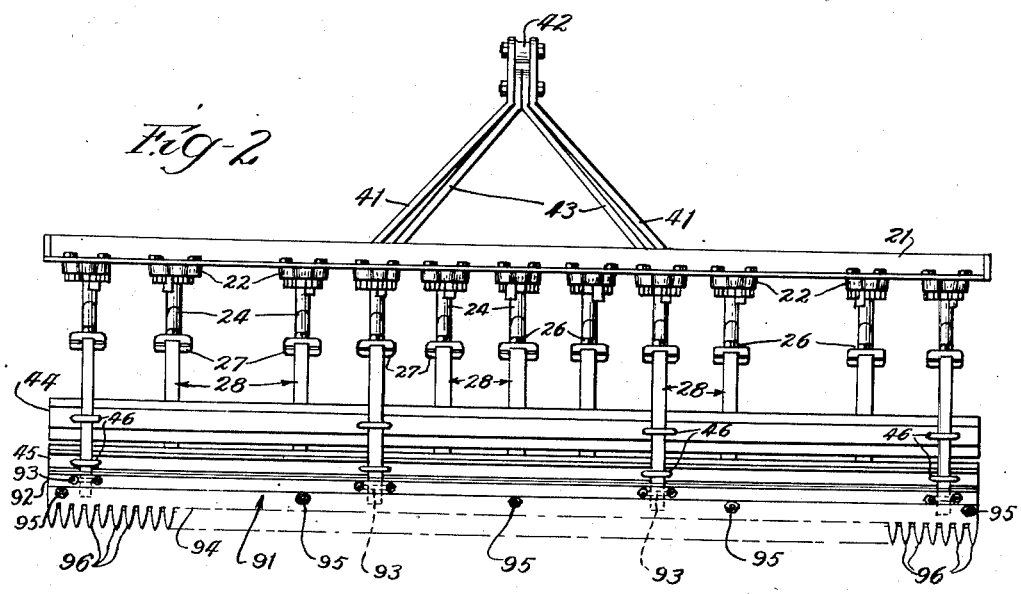
Inventor
Clare A. McKee.
By:- Mann and Brown
Attys.

Patented Oct. 2, 1951

2,570,142

UNITED STATES PATENT OFFICE 2,570,142

LAND-LEVELING DEVICE

Clare A. McKee, Highland Park, Ill.

Application January 29, 1949, Serial No. 73,459

14 Claims. (Cl. 55—33)

This invention relates to a soil tilling machine in the nature of a harrow or cultivator which is adapted to perform a plurality of functions not only in connection with general farming and landscaping, but also for road or other similar construction work involving the movement and tilling of soil.

Among the objects of my invention is the provision of a versatile machine for tilling or treating soil which will either separately or in combination scarify, cultivate, turn, mix, pulverize, level and clean soil.

Further objectives include the provision of a machine of the type described which will, by its action, assist in preventing soil erosion, limit the maximum size of clods remaining in the soil after treatment, and by adjustment serve as a grader or scraper.

It is well known that there are available on the market today a great number of soil tilling implements such as harrows, plows, rakes, graders, scrapers, and the like, each of which is specifically designed to perform a certain function. However, these machines are not as a rule capable of adjustment to perform a multiplicity of other functions, thereby necessitating the purchase of several machines. Furthermore, there are certain specific functions pertinent to the tilling of soil which can be performed only with difficulty even when the most modern of equipment is employed. As a specific example of this type of problem is the mixing of sludge into the soil as a fertilizer. Even aside from the expense of purchasing a number of different types of machines, the time consumed in transporting these machines to and from work is considerable. To overcome these objections, I have devised a machine which, when properly adjusted and used, will replace a large number of the machines now in use by performing their intended functions either alone or in combination with the function of another machine in a similar or more expeditious manner.

Briefly, my machine may be constructed by adjustably attaching to parallel sets of teeth projecting from a frame one or more vertically spaced bars. As a more specific example, I may attach vertically spaced bars transversely across the rows of teeth in a spring tooth harrow. Preferably the lower bar is positioned a short distance upwardly from the points of the teeth and a second bar is spaced upwardly from the first in such manner that soil turned by the teeth is rolled in front of the teeth and the bars thereby thoroughly mixing and pulverizing the soil. The lower bar limits the depth of penetration of the teeth and performs a grading and leveling action as well as acting in conjunction with the upper bar to mix, cut and crush the clods. A certain amount of soil passes through the opening between the spaced bars during this action and is completely pulverized and leveled by a rake bar on the rear row of teeth. Depth control may be exercised by varying the distance between the lower bar and the point of the teeth to which it is secured.

The bars which interconnect the teeth not only act as a blade in performing a grading and leveling action, but also serve to provide an interaction between the resilient movement of the individual teeth as they are dragged through the soil. Instead of the teeth moving individually, the forces applied to each of the teeth are transmitted through the bar to the other teeth, and the actual movement of the bar and teeth is produced by the algebraic sum of the forces acting on each of the teeth in a row. In actual operation it will be noted that the algebraic sum of these forces is such that the bar and the teeth in a given row are constantly pushed back and forth along a line substantially transverse to the line of movement of the tilling machine as it is dragged across the soil. Thus the soil that has rolled up in front of the bar or blade as it may be termed, will not only be pushed forwardly by the bar, but it will also be pushed back and forth in a sidewardly direction, filling any low spots that may be encountered and resulting in an even grade to the rear of the machine.

Furthermore, by interconnecting the tines, no single tine can be forced beyond its elastic limit because any force that tends to do this is transmitted to the other tines, and in this way the tines are protected from damage and have greatly extended life.

To secure an even-surfaced grade of finely pulverized material after the land-leveling device has been moved over the soil, a rake is attached to the rear of the rearwardly row of teeth, and the transverse movement of that row of teeth is transmitted to the rake. Preferably the rake is formed with a plurality of closely spaced teeth projecting to the rear of the rake. The teeth are mounted so as to be at only a slight angle with respect to the surface of the soil. As the rake is moved transversely by the motion of the rearwardly set of harrow teeth, the rake teeth are, in turn, given a back and forth transverse movement, producing a smooth finish grade of finely pulverized soil.

The present application is a continuation-in-part of my prior application, Serial No. 691,032, now abandoned, and the descriptions and drawings of said application are incorporated herein by reference to the extent that they are not inconsistent herewith.

Additional objects and advantages will become apparent from the following description taken in conjunction with the drawings, in which Fig. 1 is a side view of an embodiment of the invention; and Fig. 2 is a rear view of the embodiment illustrated in Fig. 1.

To illustrate my invention, I have selected a spring tooth harrow of the type adapted for rigid pivotal connection to a tractor, although it is equally applicable to similar towed implements. As is customary in such equipment, a frame, generally designated 20, may be formed of two or more transverse angle iron sections 21 spaced longitudinally by cross bars 22 suitably secured to the angle iron sections 21 as by bolts. U-bolts 23 extend through suitably positioned openings in the cross bars 22 to adjustably receive and secure angular support brackets 24 which extend downwardly and laterally therefrom. The lower ends of the support brackets 24 are widened to receive through bolts 26 and grooved washers 27 between which the spring tooth and resilient arm assembly, or tines generally designated 28, may be adjustably secured. The tooth assembly 28 is hook shaped, having a straight section 33, which extends through grooved washers 27 and a downwardly directed curved section 29 having soil-engaging blades or teeth 31 removably secured to the ends thereof as by bolts 32. Other means such as U-bolts may be employed to secure the tooth assembly 28 to the support bracket 24 in place of the grooved washer 27 and bolt 28, thus eliminating the necessity of perforating and weakening the straight section 33 and increasing the flexibility of adjustment. The tooth assemblies 28 are positioned to form a series of substantially parallel longitudinally spaced rows of teeth including a front or leading row 34, a center row 36, and a rear row 37.

The tractor hitch may be of any conventional type, and may include a pair of towing brackets 38 attached to the forward angle iron section 21 and pivotally connected to lower links 39 suitably arranged for attachment to the lower portion of the differential case of a tractor (not illustrated). Forked arms 41 extend upwardly from the brackets 38 and converge to a pivotal connection at their upper ends to an upper link 42 adapted for attachment to a tractor at a point above the point of attachment of the lower links 39 in such manner that the frame 20 may be raised and lowered by the suitable application of power from the driver's seat. Braces 43 may extend from the upper end of the forked arm 41 to the rear angle iron section 21.

Upper and lower transverse bars 44 and 45 respectively are attached to the rear row of teeth 37 by means of U-bolts 46 extending through the bars 44 and 45 and around the individual spring tooth assemblies 28. While various shapes may be employed, I prefer to use bars having a cross-sectional configuration of a flanged channel. The bars are placed with the web of the channel against the front face of assemblies 28 and are positioned so that the adjacent flanges of bars 44 and 45 are spaced from each other. In this position the two bars 44 and 45 form a pusher blade, which also will have a pulverizing action on the clods of earth that may be forced into contact with the blade. Fine portions of the soil will fall through the space between the two adjacent flanges of the bars.

On the middle row of teeth 36 the bars 44 and 45 may be positioned similar to those on the rearward teeth 37. However, in the particular embodiment illustrated I prefer to position the upper bar 44 with the flanges of the bar in contact with the front face of the assemblies 28, and position the lower bar 45 somewhat lower with the flanges of the bar in contact with the rear face of the tooth assemblies.

In this position a substantial space is allowed between the adjacent flanges of bars 44 and 45, which will permit the passage of a good share of the soil dug up by the first two rows of teeth. Large clods of earth will not pass through this space, however, and will be rolled ahead of the middle row of teeth 36 until the clod has disintegrated to a somewhat smaller size.

Bars 45 tend to work beneath the surface of the soil, cutting and dislodging roots and rocks and turning up the earth ahead of the bars to provide a good mixing action. This, of course, depends upon the positioning of frame 20 with respect to the ground. If frame 20 is tilted downwardly in the rear, the digging and cutting effect of bar 45 on both the middle and rear row will be more pronounced. If the bar strikes an obstruction which cannot be dislodged, no damage will occur, inasmuch as the spring action of arms 28 will allow the arm and bar to spring upwardly over the obstruction.

While bars similar to those used on the two rearwardly rows of teeth may be employed on the front row 34, I prefer to use only a single angle iron 44a, having one flange thereof abutting the front side of tooth assemblies 28 and attached by means of U-bolts 46. The angle is placed with the forwardly projecting flange thereof above the flange abutting the arms. Through the use of a single bar 44a, the individual tooth and arm assemblies 28 of the front row 34 are connected together to provide an interrelationship between the action of the front row of teeth while still permitting the majority of earth turned up by the front row of teeth to pass through that row unimpeded.

If frame 20 is tilted so that the back end of the frame is projecting upwardly, the front row 34 may be used for deep digging and furrowing, with bar 44a limiting the depth of cut. In some practices of the invention it may be desirable to lower the position of bar 44a with respect to blades 31 and thus produce a lesser depth of cut.

Since the arms of assemblies 28 are resilient, the rows of teeth, and particularly the rear row 37, spring back and forth more or less continuously, thus aiding in the mixing, pulverizing and leveling action. The blade formed by rear bars 44 and 45 roll and push the dirt ahead of it, by which action the dirt is ground sufficiently small to pass under the blade and rake. If a low spot is encountered, it will be immediately filled from the accumulation ahead of the blade.

Although it might be expected that the rows of teeth and bars would quickly become clogged with soil, such is not the case, since the springing action of the rows of teeth, combined with the rolling action of the soil produced by the bars, quickly frees the implement of even moist and adherent soil.

Behind the rearwardly row of teeth 37 is a fixed rake, generally 91, to insure an even finished surface of the soil behind the machine. While the rake may be constructed in various ways, the embodiment illustrated in Figs. 1 and 2 utilizes an angle iron 92 positioned with one flange down and projecting rearwardly and the other flange in contact with the rear face of assemblies 28. U-bolts 93 hooked around the front side of the teeth project through holes in the upward flange of the angle, and nuts threaded onto the arms of the U-bolts secure the angle 92 to the teeth. A rake blade 94 is secured to the lower flange of angle 92 by means of bolts 95. The rearwardly edge of blade 94 is formed with a series of teeth 96 which are relatively narrow and spaced quite close together.

The rake assembly 91 further secures the individual teeth 28 on the rear row 37 to each other to insure that the forces acting upon the individual teeth will to a great extent be transmitted therebetween. In addition, the movement of row 37 is transmitted to blade 94, with the result that teeth 96 are continually agitated back and forth transversely of the line of movement of the machine along the ground, thus producing a smooth finished bed of finely divided material behind the machine.

I have found that with the usual harrow construction the mounting of rake blade 94 in the manner just described places the blade at a suitable angle to the surface of the ground to produce a highly satisfactory smoothing action. In some embodiments, however, it might be desirable to bend the angle 92 or the blade 94 to position the blade at a more suitable angle to the ground. Wedge-shaped shims or spacers may be used between rake 94 and angle iron 92, or between assemblies 28 and angle iron 92, to accomplish the same effect.

The action of the device may be briefly summarized as follows: The front row digs or plows deeply; the second row tears up rocks and debris from the subsoil, brings all debris to surface, and performs a cleaning and rough grading action as the lower bar travels under the surface; the rear row comprises an earth-carrying blade in front of the teeth or tines and a heavy rake bar attached to the rear of the teeth and accomplishes a complete job of filling low spots, leveling to an exact grade, pulverizing and fine grading, superior to hand finishing.

It has been found in practice that the greater the amount of dirt that piles up in front of each row of tines, the better the job that is done due to the thorough grinding action of the mass of dirt as it is rolled along ahead of the rows of tines.

Soil prepared with my implement is highly resistant to erosion by wind or water since the relatively solid unworked soil lying below the shallow mixed layer of loose top soil is ridged by the action of the blades 31. If the tilling is conducted in such manner as to dispose these ridges transversely to the direction of the prevailing wind or water flowage, the ridges will form in effect a series of riffles which materially assist in preventing erosion of the loosened top soil. Under severe conditions, fibrous material such as hay, straw or stubble may be deliberately added and mixed into the top soil with my implement, forming a mass which can be eroded only with difficulty.

One of the great advantages of my soil working device is its simplicity and lack of power-driven parts. This is in contradistinction to many soil working devices which have power-driven rotary tines or similarly driven weed bars.

Various other changes, such as the specific positioning of bars 44 and 45 in the various rows, may be desirable under varying circumstances. For this reason, it should be understood that the foregoing description is made for illustrative purposes and for compliance with Section 4888 of the Revised Statutes and should not be construed as imposing unnecessary limitations on the appended claims.

I claim:

1. Soil working apparatus including a frame adapted to be moved over the soil, means including a plurality of teeth and resilient mountings therefor connecting said teeth to said frame, and means laterally interconnecting said first-mentioned means adjacent to the teeth, said last-mentioned means being relatively rigid to cause lateral displacement of any one tooth to be transmitted to the other teeth, thereby to provide an interaction between the resilient movement of the teeth as they are dragged through the soil, said last-mentioned means including a rake projecting rearwardly from said teeth.

2. Soil working apparatus including a frame adapted to be moved over the soil, means including a plurality of teeth and resilient mountings therefor connecting said teeth to said frame, means laterally interconnecting said first-mentioned means adjacent to the teeth, said last-mentioned means being relatively rigid to cause lateral displacement of any one tooth to be transmitted to the other teeth, thereby to provide an interaction between the resilient movement of the teeth as they are dragged through the soil, said last-mentioned means including a rake projecting rearwardly from said teeth, and at least one transverse bar interconnecting said first-mentioned means between said last-mentioned means and said frame.

3. Soil working apparatus including a frame adapted to be moved over the soil in spaced relationship thereto, means including a plurality of downwardly projecting teeth and resilient mountings therefor connecting said teeth to said frame, a soil moving blade laterally interconnecting said means, said blade being relatively rigid to cause lateral displacement of any one tooth to be transmitted to the other teeth, thereby to provide an interaction between the resilient movement of the teeth, and a rake attached to said means and projecting rearwardly therefrom.

4. Soil working apparatus including a frame adapted to be moved over the soil in spaced relationship thereto, a plurality of at least partially curved spring arms positioned in substantially transverse alignment, the upper end of said arms being connected to said frame with the arms projecting downwardly therefrom, tooth means projecting from the lower end of each of said arms, an earth moving blade interconnecting said arms, and a rake attached to said arms and projecting rearwardly therefrom.

5. Soil working apparatus including a frame adapted to be moved over the soil in spaced relationship thereto, a plurality of at least partially curved spring arms positioned in substantially transverse alignment, the upper end of said arms being connected to said frame with the arms projecting downwardly therefrom, tooth means projecting from the lower end of each of said arms, an earth moving blade interconnecting said arms, said blade being relatively rigid to cause lateral displacement of any one tooth to be transmitted to the other teeth, thereby to provide an interaction between the movement of said arms as the tooth means are dragged through the soil, and a rake having rearwardly projecting teeth, said rake being attached to said arms adjacent to the lower end thereof.

6. Soil working apparatus including a frame adapted to be moved over the soil in spaced relationship thereto, a plurality of spring arms connected at the upper end thereof to said frame, said arms being positioned in a plurality of transverse rows, a transverse bar for each of said rows and attached to each of the arms in the row, tooth means projecting from the lower end of each of said arms, said bar being relatively rigid to cause lateral displacement of any one tooth in a given row to be transmitted to the other teeth in said given row, thereby to provide an interaction between the spring movement of the arms as the tooth means are dragged through the soil, and a rake attached to the arms in the rearwardly row and projecting rearwardly therefrom.

7. In a soil working device, a plurality of rows of resiliently mounted tines, a cross bar extending laterally between the tines of each row whereby forces acting on a single tine are transmitted to other tines in the same row, the cross bar mounted on the last row of tines being located on the rearward face thereof adjacent to their lower margins to serve as a leveling device and to fill in the tracks left by the tines while traversing the ground.

8. In a soil working device, a plurality of rows of resiliently mounted tines, a cross bar extending laterally between the tines of each row whereby forces acting on a single tine are transmitted to other tines in the same row, the cross bar mounted on the last row of tines being located on the rearward face thereof adjacent to their lower margins to serve as a leveling device and to fill in the tracks left by the tines while traversing the ground, said last named bar being serrated to provide rake teeth.

9. In a soil working device, a plurality of rows of resiliently mounted tines, a cross bar extending laterally between the tines of each row whereby forces acting on a single tine are transmitted to other tines in the same row, the cross bar mounted on the last row of tines being located on the rearward face thereof adjacent to their lower margins to serve as a leveling device and to fill in the tracks left by the tines while traversing the ground, another of said bars being mounted on the rearward face of a preceding row of tines adjacent to their lower margins, said last named bar having a blade-like portion adapted to penetrate the surface of the soil to cut roots and dislodge rocks.

10. In a soil working device, a plurality of rows of resiliently mounted tines, a fixed cross bar extending laterally between the tines of each row and rigidly attached thereto, whereby forces acting on a single tine are transmitted to other tines in the same row, the cross bar mounted on the last row of tines being located near their lower margins to act as a leveling device.

11. In a soil working device, a plurality of rows of resiliently mounted tines, a cross bar extending laterally between the tines of each row whereby forces acting on a single tine are transmitted to other tines in the same row, the cross bar mounted on the last row of tines being located near their lower margins to act as a leveling device, and other bars mounted on one or more of said rows of tines for gathering earth in front of the tines and rolling it over and over to break it up and allow it to fall into low places traversed by the device.

12. In a soil working device, a plurality of rows of resiliently mounted tines, a cross bar extending laterally between the tines of each row whereby forces acting on a single tine are transmitted to other tines in the same row, the cross bar mounted on the last row of tines being located near their lower margins to act as a leveling device, other bars mounted on one or more of said rows of tines for gathering earth in front of the tines and rolling it over and over to break it up and allow it to fall into low places traversed by the device, and means for tilting the device about a transverse horizontal axis to adjust the penetration of the plural rows of tines.

13. In a soil working device, the combination of a plurality of resiliently mounted tines mounted in a row, a cross bar secured to the rearward face of said row of tines adjacent to their lower margins to serve as a leveling device and to fill in the tracks left by the tines while traversing the ground, and one or more additional bars secured to the tines at a higher level than said first cross bar.

14. Soil working apparatus including a frame adapted to be moved over the soil, means including a plurality of teeth mounted in a lateral row and resilient mountings therefor connecting said teeth to said frame, said resilient means being sufficiently flexible so that each tooth may yield substantially laterally and longitudinally when it strikes an obstacle and then return to normal position, and means laterally interconnecting said resilient mountings adjacent to the teeth, said last-mentioned means being relatively rigid to cause lateral displacement of any one tooth to be transmitted to the other teeth, thereby to provide an interaction between the resilient movement of the teeth as they are dragged through the soil.

CLARE A. McKEE.

REFERENCES CITED

The following references are of record in the file of this patent:

UNITED STATES PATENTS

| Number | Name | Date |
| --- | --- | --- |
| 1,329,953 | Borgesson | Feb. 3, 1920 |
| 1,895,875 | Beeman | Jan. 31, 1933 |

FOREIGN PATENTS

| Number | Country | Date |
| --- | --- | --- |
| 59,346 | Sweden | Oct. 16, 1922 |